April 21, 1959     R. M. SHAW     2,882,718
RATE GYROSCOPE CALIBRATING DEVICE
Filed June 3, 1955

INVENTOR
ROBERT M. SHAW
BY
ATTORNEYS

United States Patent Office 2,882,718
Patented Apr. 21, 1959

2,882,718

RATE GYROSCOPE CALIBRATING DEVICE

Robert M. Shaw, Glen Burnie, Md., assignor, by mesne assignments, to the United States of America as represented by the Secretary of the Navy Application June 3, 1955, Serial No. 513,168

13 Claims. (Cl. 73—1)

The present invention relates to calibrating apparatus for rate gyroscopes, more particularly the invention relates to a calibrating device for rate gyroscopes wherein a desired torque is applied about the gimbal axis of a gyroscope. Such torque may be effected by applying, for example, one end of a balance beam against a portion of the gimbal assembly, the beam applying to the gimbal assembly a measured force whereby the gimbal is rotated about the gimbal axis thereof to generate a torque which simulates the torque generated by rotation of the gyro about its sensitive axis.

Heretofore rate gyroscopes have been calibrated by being placed on a turntable and comparing the output voltages of the gyroscopes with the known rotational rates of the turntable. Such practice is accompanied by certain disadvantages of which the following are worthy of note. The turntables employed must be extremely accurate in regard to both instantaneous and average rotational rates. As a result thereof adequate turntables are both expensive and difficult to produce. The turntables are large and cumbersome and it is, therefore, difficult to take such gyro calibrating equipment into the field. Such turntables are not accurate aboard ships at sea as the motion thereof affects the rotational rate as seen by a gyro mounted on such turntable.

In the present invention, several modifications of structure are employed for applying the desired torque to the gyroscope of which the following will serve as examples:

(1) By hanging suitable weights at a radius from the axis of the balance bar.

(2) By applying force by means of calibrated springs at a radius from the axis of the balance bar.

(3) By applying the torque about the axis of the balance bar by means of a dynamometer or other suitable means for generating a measured torque on the shaft of the balance bar.

An object of the present invention is to provide apparatus for calibrating a rate gyroscope wherein the apparatus occupies little space, is light in weight, and is economical to manufacture.

Another object is to provide apparatus for calibrating a rate gyroscope which is easily transported for operation in the field.

Still another object is to provide apparatus for calibrating a rate gyroscope on which the motion encountered on ships at sea causes little or no effect on the accuracy of such calibration within the limits required.

Other objects and many of the attendant advantages of this invention will be readily appreciated as the same becomes better understood by reference to the following detailed description when considered in connection with the accompanying drawings wherein.

Figure 1:
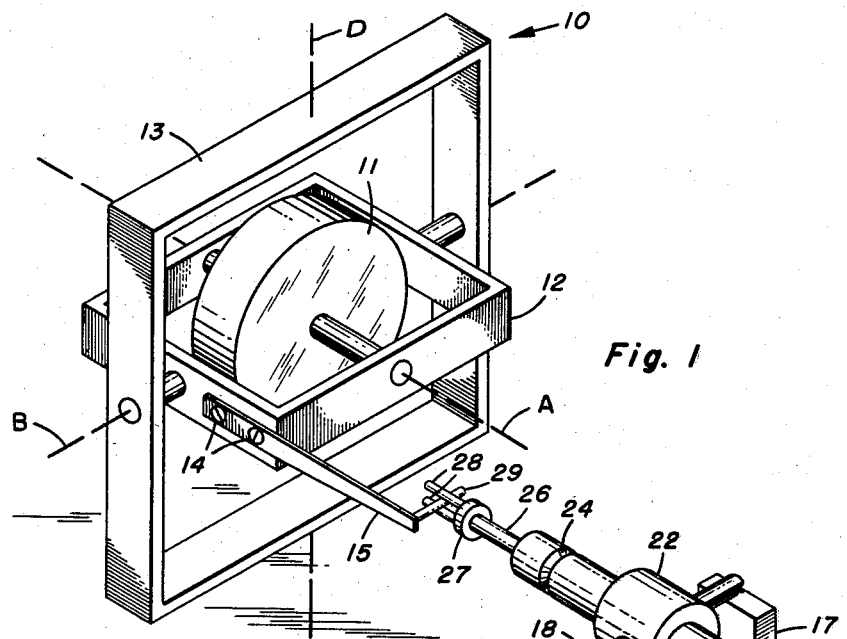
Fig. 1 is a schematic isometric view of a preferred form of the present invention.

Referring more particularly to the drawings wherein like numerals indicate like parts throughout the several views 10 indicates generally a conventional rate gyroscope shown in schematic form in Fig. 1 of the drawings. Gyroscope 10 comprises for the sake of illustration a rotor 11 having a spin axis A, it being understood that rotor 11 may be driven in any well known manner such, for example, as by an electric motor (not shown). Rotor 11 is mounted for rotation on axis A in inner gimbal ring 12, while gimbal ring 12 is mounted for rotation on a gimbal axis B perpendicular to axis A in outer gimbal ring 13. Perpendicular to both axes A and B is a sensitive axis D about which the outer gimbal ring would rotate if it were so desired. Gimbal ring 13 may be secured against movement in any desired manner (not shown). Inner gimbal ring 12 has fixed thereto as at 14 an arm 15 by which torque may be applied about the axis B.

One form of apparatus for applying such torque is shown schematically in Fig. 1 and comprises a base or support 16 having vertically extending arms 17 on which shaft 18 is pivoted. It is, of course, understood that shaft 18 may be provided with knife edges 19 for highly accurate measurements or with the ball bearings (not shown) where such accuracy is not required. A scribe mark 21 is placed on the upper surface of each of the arms 17 to assist in the proper placement of shaft 18 thereon.

Shaft 18 extends through a collar 22 which supports, at right angles to shaft 18, a balance beam 23. Beam 23 is provided with a pair of annular grooves 24 and 25 equidistantly spaced from the center of beam 23 at which point shaft 18 intersects therewith. A non-metallic tip 26 is secured in one end of beam 23 and is provided with a head 27 carrying a pair of extended pins 28 mounted in vertically spaced relation.

Pins 28 are adapted to engage a pin 29 extending laterally from arm 15 fixed to gimbal ring 12.

It will thus be seen that when weight 31 is hung on groove 25 of beam 23 a torque is applied about gimbal axis B of gyroscope 10 in, for example, a counterclockwise direction as shown in Fig. 1. Torque applied about the balance axis (shaft 18) will appear about the gimbal axis B changed in accordance with the length of the lever arms involved. The torque generated about said gimbal axis simulates a torque generated by rotation of the gyroscope about its sensitive axis.

The torque may be varied by applying weights of different sizes to the beam 23. Because of the tolerances on the gyroscopic properties, the slope of the gimbal torque vs. rotational rate curves will vary from gyro to gyro. Thus if a gyro is to be calibrated to its torque vs. rate curve, there must be applied either the exact torque for a given rate or the correction known to convert from the slope of an arbitrary standard torque vs. rate curve.

If it is desired to measure the torque of the gyro in a clockwise direction about axis B an appropriate weight 31 may be hung on beam 23 at groove 24.

Figure 2:
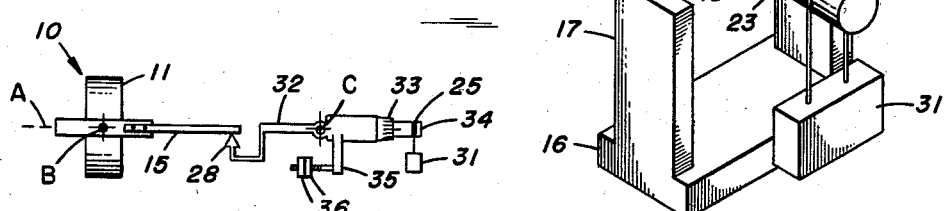
Figs. 2, 3, 4 and 5 are diagrams of modifications of means for applying the desired torque to a gyroscope.

A slightly modified form of balance beam is shown in Fig. 2 wherein a beam 32 having a balance axis C is provided with a micrometer adjusting means 33 by which the end 34 of the beam may be lengthened or shortened. A right angled arm 35 depends from beam 32 and is provided with a pair of weights or nuts 36 threaded thereon, thus to provide a means for balancing the balance beam 32. Nuts 36 may be brought together in locking relation to hold a desired balance adjustment.

Thus it will be seen that when micrometer adjusting means 33 is moved to an adjusted position in accordance with known gyroscopic qualities of a particular gyro, nuts 36 are moved to a position to counterbalance such adjustment and to bring a single pin 28 to a position where it just touches arm 15. Thereafter weights of 25, 50, and 75 grams respectively, for example, are hung on groove 25 and the gyro output readings for each weight are recorded somewhat as was done where turntables of the prior art were used and recordings were made of the gyro output at 5, 10, and 15 degrees per second. It is to be understood that, if desired, in the form shown in Fig. 1 weights of the various weights mentioned may be employed in the same manner as aforesaid.

If it is desired to apply torque to the gyro in the opposite direction the gyro is mounted top down and torque is applied in the same manner, thus providing for calibrating torque in both clockwise and counterclockwise directions with the device of Fig. 2 wherein only one pin 28 is employed.

Figure 3:
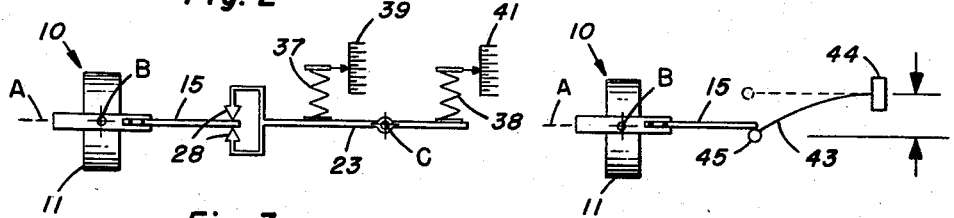

Fig. 3 shows a further modification wherein torque is applied to the gyro by a force exerted against the balance beam 23 by either one of a pair of compression springs 37 and 38 equidistantly spaced on opposite sides of axis C, spring 37 applying torque to the gyro 10 in a clockwise direction while spring 38 applies torque in a counterclockwise direction. The balance beam 23 follows closely the structure of that of Fig. 1 there being provided two pins 28 thus obviating the necessity of reversing the position of gyro 10 in order to calibrate the gyro in both directions as is the case in the form shown in Fig. 2. When it is desired to calibrate the gyro 10 in a clockwise direction spring 37 is compressed in any desired manner until a suitable reading is registered on scale 39 whereupon the output of the gyro is recorded. Calibration in a counterclockwise direction is made by retracting spring 37 and compressing spring 38 and proceeding as has been described for spring 37, the scale for spring 38 being indicated at 41.

Figure 4:
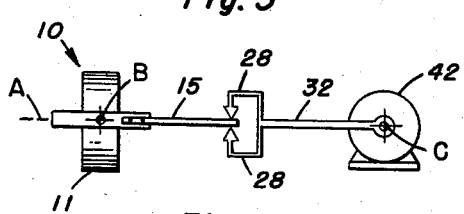

A still further modification is shown in Fig. 4 wherein a rotative force is applied directly to axis C of beam 32 such, for example, as by a dynamometer 42, thus torque may be applied to gyro 10 in either direction by changing the direction of rotation of the dynamometer.

Figure 5:
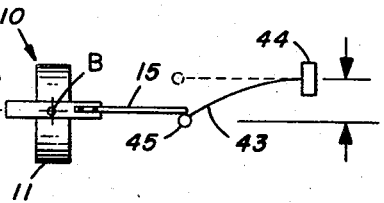

Fig. 5 shows another modification wherein a flat leaf spring 43 is mounted on one end on a block 44 for movement in a direction perpendicular to the gimbal axis B, the other end of the spring having a non-metallic tip 45 which contacts arm 15 with a force proportional to the amount of spring deflection. A measure of the amount of spring deflection is a measure of the simulated gyro rotation rate.

Obviously many modifications and variations of the present invention are possible in the light of the above teachings. It is therefore to be understood that within the scope of the appended claims the invention may be readily practiced otherwise than as specifically described

What is claimed is:

1. Apparatus for calibrating a rate gyroscope having a sensitive axis, inner and outer gimbal rings, a gimbal axis, and a rotor adapted to be rotated and comprising, an arm connected to said gyroscope and extending perpendicularly with respect to the sensitive axis of said gyroscope, a balance beam pivotally mounted intermediate the ends thereof, one end of said beam engaging said arm, and means for applying a measured torque to said beam whereby the gimbal mechanism is rotated about the gimbal axis thereof upon rotation of said rotor to generate a torque which simulates the torque generated by rotation of the gyroscope about the sensitive axis thereof.

2. Apparatus for calibrating a rate gyroscope having a gimbal mechanism including inner and outer gimbal rings, a gimbal axis, a sensitive axis, and a rotor adapted to be rotated, and comprising, means connected to said gimbal mechanism for rotating said gyroscope about the sensitive axis thereof and means connected to said first-named means for applying a measured torque to said first-named means whereby the gimbal mechanism is rotated about the gimbal axis thereof upon rotation of said rotor to generate a torque which simulates the torque generated by rotation of the gyroscope about the sensitive axis thereof.

3. Apparatus for calibrating a rate gyroscope having a gimbal mechanism including inner and outer gimbal rings, a gimbal axis, a sensitive axis, and a rotor adapted to be rotated, and comprising, a balance beam mounted adjacent said gimbal mechanism, said balance beam engaging said gimbal mechanism, and weight means suspended from said balance beam whereby the gimbal mechanism is rotated about the gimbal axis thereof upon rotation of said rotor to generate a torque which simulates the torque generated by rotation of the gyroscope about the sensitive axis thereof.

4. Apparatus for calibrating a rate gyroscope having a gimbal mechanism including inner and outer gimbal rings, a gimbal axis, a sensitive axis, and a rotor adapted to be rotated, and comprising, a balance beam mounted adjacent said gimbal mechanism, pin means extending from one end of said balance beam for engaging said gimbal mechanism, and weight means adapted to be suspended from either end of said balance beam whereby the gimbal mechanism is rotated about the gimbal axis thereof upon rotation of said rotor to generate a torque which simulates the torque generated by rotation of the gyroscope about the sensitive axis thereof in clockwise and counterclockwise directions.

5. Apparatus for calibrating a rate gyroscope having a gimbal mechanism including inner and outer gimbal rings, a gimbal axis, a sensitive axis, and a rotor adapted to be rotated, and comprising, a balance beam mounted adjacent said gimbal mechanism, pin means extending from said balance beam at one end thereof, for engaging said gimbal mechanism, means for balancing said balance beam, weight means suspended from said balance beam from the opposite end thereof whereby the gimbal mechanism is rotated about the gimbal axis thereof upon rotation of said rotor to generate a torque which simulates the torque generated by rotation of the gyroscope about the sensitive axis thereof.

6. Apparatus for calibrating a rate gyroscope having a gimbal mechanism including inner and outer gimbal rings, a gimbal axis, a sensitive axis, and a rotor adapted to be rotated, and comprising, a balance beam mounted adjacent said gimbal mechanism and having a balance axis intermediate the ends thereof, pin means extending from said balance beam at one end thereof for engaging said gimbal mechanism, weight means suspended from the end of said balance beam opposed to said one end whereby the gimbal mechanism is rotated about the gimbal axis thereof upon rotation of said rotor to generate a torque which simulates the torque generated by rotation of the gyroscope about the sensitive axis thereof, and micrometer means interposed between the end of said balance beam from which the weight means is suspended and said balance axis whereby the distance therebetween may be changed.

7. Apparatus for calibrating a rate gyroscope having a gimbal mechanism including inner and outer gimbal rings, a gimbal axis, a sensitive axis, and a rotor adapted to be rotated, and comprising, a balance beam mounted adjacent said gimbal mechanism and having a balance axis intermediate the ends thereof, pin means extending from said balance beam and engaging said gimbal mechanism, spring means engaging said balance beam a measured distance on one side of said balance axis whereby the gimbal mechanism is rotated about the gimbal axis thereof upon rotation of said rotor to generate a torque which simulates the torque generated by rotation of the gyroscope about the sensitive axis thereof in one direction, and means for varying the force of said spring means applied to said balance beam.

8. Apparatus as set forth in claim 7 and in addition thereto comprising, second spring means engaging said balance beam a measured distance on the side opposite to said one side of said balance axis whereby the gimbal mechanism is rotated about the gimbal axis thereof to generate a torque which simulates the torque generated by rotation of the gyroscope about the sensitive axis thereof in a direction opposite to said one direction.

9. Apparatus for calibrating a rate gyroscope having a gimbal mechanism including inner and outer gimbal rings, a gimbal axis, a sensitive axis, and a rotor adapted to be rotated, and comprising, a beam having an axis of rotation, pin means extending from the end of said beam and engaging said gimbal mechanism, and rotative torque applying means attached to said beam at the axis of rotation thereof whereby the gimbal mechanism is rotated about the gimbal axis thereof upon rotation of said rotor to generate a torque which simulates the torque generated by rotation of the gyroscope about the sensitive axis thereof.

10. Apparatus for calibrating a rate gyroscope having a gimbal mechanism including inner and outer gimbal rings, a gimbal axis, a sensitive axis, and a rotor adapted to be rotated, and comprising, a beam having an axis of rotation, pin means extending from the end of said beam and engaging said gimbal mechanism, and a dynamometer having the shaft thereof secured to said beam at the axis of rotation thereof whereby the gimbal mechanism is rotated about the gimbal axis thereof upon rotation of said rotor to generate a torque which simulates the torque generated by rotation of the gyroscope about the sensitive axis thereof.

11. Apparatus for calibrating a rate gyroscope provided with a gimbal mechanism including inner and outer gimbal rings, a gimbal axis, a sensitive axis, and a rotor adapted to be rotated, said mechanism having an arm extending therefrom for rotating said gyroscope about the sensitive axis thereof and comprising, a leaf spring supported at one end thereof for motion at right angles to said arm and perpendicular to the sensitive axis of said gyroscope, and a tip mounted on the unsupported end of said spring, said tip engaging said arm whereby the gimbal is rotated about the gimbal axis thereof upon rotation of said rotor to generate a torque which simulates the torque generated by rotation of the gyroscope about the sensitive axis thereof.

12. Apparatus for calibrating a gyroscope having a gimbal mechanism including inner and outer gimbal rings, a gimbal axis, a sensitive axis, and a rotor adapted to be rotated, comprising a support adjacent said gimbal mechanism, a balance beam mounted on said support, pin means extending from one end of said balance beam, an arm secured to said gimbal mechanism and engaged by said pin means, and weight means adapted to be suspended from either end of said beam whereby the gimbal mechanism is rotated about the gimbal axis thereof upon rotation of said rotor to generate a torque which opposes the torque generated by rotation of the gyroscope about the sensitive axis thereof in clockwise and counterclockwise direction.

13. The combination set forth in claim 12 and said support comprising spaced arms for mounting said balanced beam thereon, and shaft means extending from opposite sides of said balance beam, said shaft means having a knife edge on the underside thereof resting on said arms.

References Cited in the file of this patent

UNITED STATES PATENTS

| | | |
|---|---|---|
| 2,423,349 | Sonntag | July 1, 1947 |
| 2,540,754 | Newell | Feb. 6, 1951 |
| 2,690,014 | Draper | Sept. 28, 1954 |
| 2,741,118 | Ricciardi | Apr. 10, 1956 |

OTHER REFERENCES

NACA Technical Note 662, 1938, pages 10–14 and Fig. 4.